US011043832B2

(12) United States Patent
Melgarejo et al.

(10) Patent No.: US 11,043,832 B2
(45) Date of Patent: Jun. 22, 2021

(54) INDUCTIVELY COUPLED WIRELESS CHARGER

(71) Applicant: Flex Ltd., Singapore (SG)

(72) Inventors: Manolo Mariano M. Melgarejo, New Taipei (TW); Zheng-an Lin, Taichung (TW); Sunny Sun, New Taipei (TW)

(73) Assignee: Flex Ltd., Singapore (SG)

( * ) Notice: Subject to any disclaimer, the term of this patent is extended or adjusted under 35 U.S.C. 154(b) by 43 days.

(21) Appl. No.: 16/418,600

(22) Filed: May 21, 2019

(65) Prior Publication Data

US 2019/0356152 A1 Nov. 21, 2019

Related U.S. Application Data

(60) Provisional application No. 62/674,503, filed on May 21, 2018.

(51) Int. Cl.
*H04B 5/00* (2006.01)
*H02J 50/40* (2016.01)
*H02J 7/02* (2016.01)
*H01F 38/14* (2006.01)
*H02J 50/12* (2016.01)

(52) U.S. Cl.
CPC .............. *H02J 7/025* (2013.01); *H01F 38/14* (2013.01); *H02J 50/12* (2016.02); *H02J 50/40* (2016.02)

(58) Field of Classification Search
CPC . H02J 7/025; H02J 50/12; H02J 50/40; H01F 38/14
See application file for complete search history.

(56) References Cited

U.S. PATENT DOCUMENTS

| 7,826,873 | B2 | 11/2010 | Telefus | |
|---|---|---|---|---|
| 9,190,851 | B2* | 11/2015 | Kim | .................. H02J 50/80 |
| 10,075,018 | B2* | 9/2018 | Park | .................. H02J 50/12 |
| 2015/0380972 | A1* | 12/2015 | Fort | .................. A61N 1/3787 |
| | | | | 320/108 |
| 2016/0322849 | A1* | 11/2016 | Yeh | .................. H01Q 7/00 |
| 2020/0153283 | A1* | 5/2020 | Kanakasabai | ......... H02J 50/402 |
| 2020/0176990 | A1* | 6/2020 | Bhat | .................. H02J 3/34 |

* cited by examiner

*Primary Examiner* — Dinh T Le
(74) *Attorney, Agent, or Firm* — Sheridan Ross P.C.

(57) ABSTRACT

An inductively coupled wireless charging system produces a high magnetic flux density to induce voltages in one or more coils of an electronic device via magnetic induction. These induced voltages are used to operate or charge batteries in the one or more electronic devices. The high magnetic flux density may cause electromagnetic interference to other adjacent devices, including other adjacent wireless charging systems. Methods, systems, and devices of the present disclosure are directed to reducing interference among adjacent wireless charging systems during concurrent operation of the adjacent wireless charging systems.

16 Claims, 9 Drawing Sheets

INDUCTIVELY COUPLED WIRELESS CHARGER

CROSS REFERENCE TO RELATED APPLICATION

The present application claims the benefits of and priority, under 35 U.S.C. § 119(e), to U.S. Provisional Application Ser. No. 62/674,503, filed on May 21, 2018, entitled "Inductively Coupled Wireless Charger." The entire disclosure of the application listed above is hereby incorporated by reference, in its entirety, for all that it teaches and for all purposes.

FIELD

The present invention is related generally to the transfer of power without the use of wires, and more specifically to methods, systems, and devices directed to inductively coupled wireless chargers.

BACKGROUND

Household portable electronics, cellular phones, personal digital assistants, music players, digital cameras, and many other portable electronic devices are common consumer products. One attribute that these consumer electronics share is the need to power and charge the batteries within the devices. Typically, each electronic device is designed and built with its own unique power cell and charging adaptor. The charging adaptors typically run on electricity from an electrical outlet, a car cigarette lighter, power bank, USB port, or from another suitable power supply wired to the electronic device. While the use of charging adaptors can be efficient, charging adaptors pose many problems, such as: wear and tear of cable and connector; damaged due to wrong connector insertion; corrosion to connector and other internal parts due to water ingress. The key advantage for wireless chargers is not having to plug in a charging cable. As a result, inductively coupled wireless chargers are becoming more prevalent.

Inductively coupled wireless chargers emit electromagnetic (EM) noise that is radiated into free space from such wireless chargers. Although designed to comply with electromagnetic interference (EMI), electromagnetic compatibility (EMC), and radio frequency (RF) standards, this EM noise may interfere with proper operation of circuits in adjacent wireless chargers. To charge batteries in a remote electronic device via remote inductive coupling a powerful signal is required to energize a primary (transmitter) coil in the wireless charger with an oscillating electromagnetic field that induces a current in a secondary (receiver) coil in the electronic device that is in close proximity to the wireless charger. Such a signal is usually transmitted at a switching frequency close to the resonant frequency for best power transfer, causing a strong spectral density of energy at that frequency and a large amount of radiated electromagnetic noise. To allow the transmitter of the wireless charger to control the voltage induced in the electronic device's receiver, feedback communication data is sent by the receiver to the transmitter using in-band amplitude modulation. Due to the leakage flux resulting from the inductive coupling between a wireless charger and an electronic device, the leaked EM noise may cause interference to the communication channel on any adjacent wireless charger(s) and the electronic device(s) being charged.

DETAILED DESCRIPTION

Embodiments of the present disclosure will be described in connection with the transfer of power without the use of wires, such as may be embodied as inductively coupled wireless chargers and components, methods of use, and variations thereof.

Figure 1:
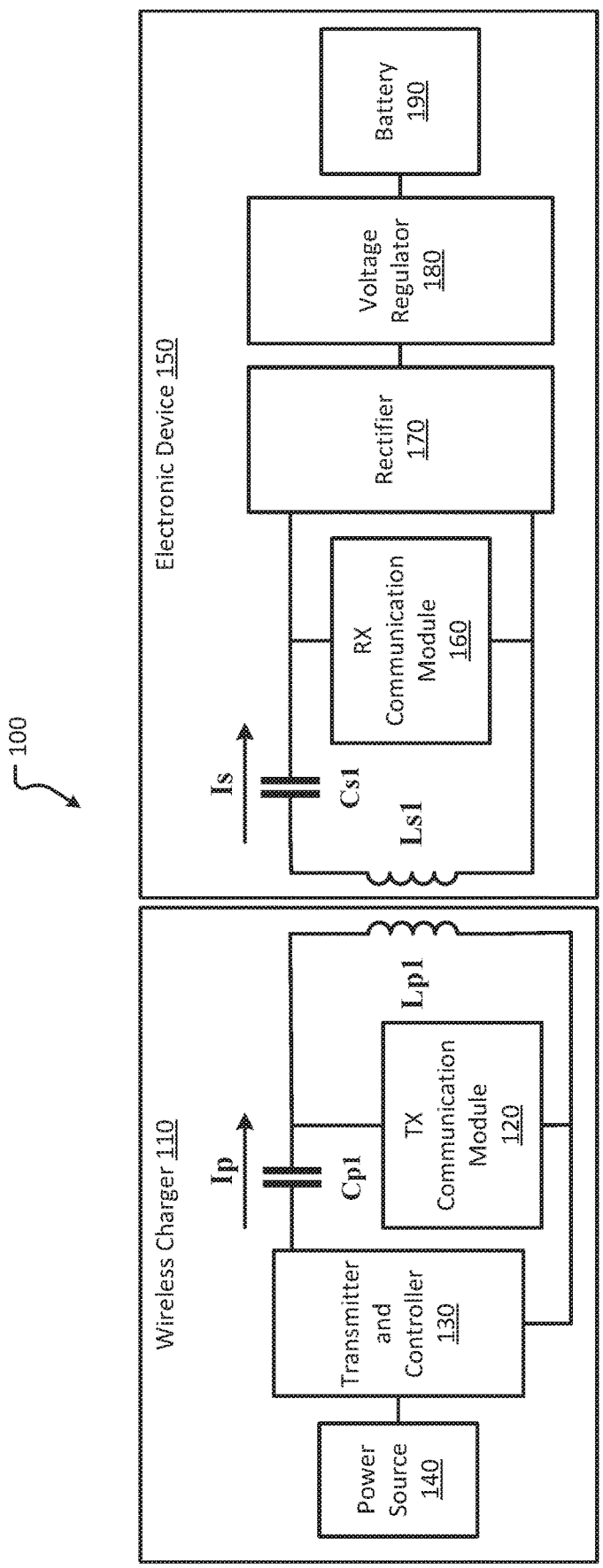
FIG. 1 is a schematic diagram of a wireless charger charging an electronic device in accordance with embodiments of the present disclosure.

FIG. 1 is a schematic diagram 100 of a wireless charger 110 charging an electronic device 150 in accordance with embodiments of the present disclosure. Wireless charger 110 comprises transmitter (TX) communication module 120, transmitter and controller 130, power source 140, and a primary resonant circuit, depicted as capacitance $C_{p1}$ in series with inductance $L_{p1}$. Electronic device 150 comprises a receiver (RX) communication module 160, rectifier 170, voltage regulator 180, battery 190, and a secondary resonant circuit, depicted as capacitance $C_{s1}$ in series with inductance $L_{s1}$.

Transmitter and controller 130 may comprise a single-phase or multi-phase transmitter to generate a power signal at a switching frequency to provide a voltage requested by the electronic device 150, the receiver. The operating or switching frequency is dependent on the resonant frequency of the coupled primary and secondary resonant circuits, for a desired operating voltage gain to regulate a voltage on electronic device 150. RX communication module 160 may comprise a modulator for amplitude-shift-keying (ASK) to provide feedback to transmitter and controller 130 and as a frequency demodulator for frequency-shift-keying (FSK) for receiving data from the transmitter and controller 130, as well as other communication requirements. In some embodiments, the electronic device 150 may periodically send a Control Error Packet (CEP) containing a Control Error Value to the wireless charger 110 that is charging the electronic device 150 to cause the wireless charger 110 to adjust the power that is being transferred by increasing the primary coil voltage/current ($V_p$ or $I_p$) or by adjusting the operating frequency, further described in FIG. 4. The rectifier 170 converts the alternating current $I_s$ to a direct current/voltage that is adjusted by the voltage regulator 180 to charge the battery 190, which may comprise one or more batteries or battery cells. The communication data transferred between the electronic device 150 and the wireless charger 110 is not limited to CEP but also involves real-time monitoring data exchange for proper operation of both the wireless charger 110 and the electronic device 150.

The resonant circuit of the wireless charger 110 and the electronic device 150 may consist of multiple inductances and capacitances that are in parallel, series, or any combination thereof. Additionally, inductance $L_{p1}$ and/or $L_{s1}$ may include a core material, which is shown as an air core in FIG. 1, that may consist of ferrite, steel, alloy, powdered metal, and/or other core material—including combinations thereof. One primary coil and one secondary coil is shown. In some embodiments, multi-coil assembly construction may be used in the wireless charger 110 and/or the electronic device 150.

Figure 2:
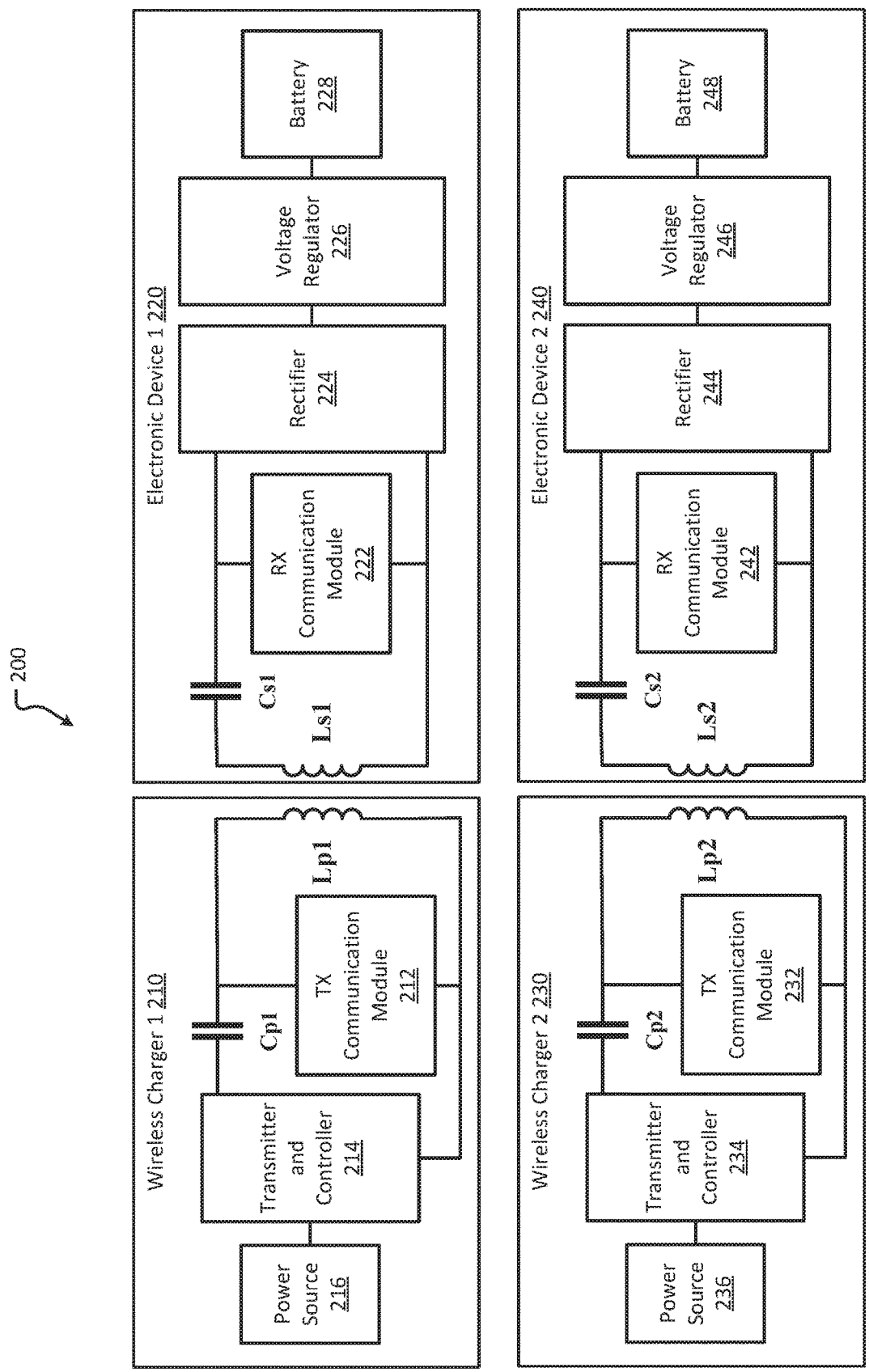
FIG. 2 is a schematic diagram of two adjacent wireless chargers charging two electronic devices in accordance with embodiments of the present disclosure.

FIG. 2 is a schematic diagram 200 of two adjacent wireless chargers, the wireless charger 1 (210) and the wireless charger 2 (230) charging two electronic devices, the electronic device 1 (220) and the electronic device 2 (240), respectively, in accordance with embodiments of the present disclosure. Although only two wireless chargers and two electronic devices are shown, it should be appreciated that additional wireless chargers and/or electronic devices may be positioned adjacent to each other in a similar manner as illustrated.

The wireless charger 1 (210) and the wireless charger 2 (230) are instances of the wireless charger 110, as described in FIG. 1. Similarly, the electronic device 1 (220) and the electronic device 2 (240) are instances of the electronic device 150, as described in FIG. 1. The wireless charger 1 (210) comprises a TX communication module 212, a transmitter and controller 214, a power source 216, and a primary resonant circuit, depicted as capacitance $C_{p1}$ in series with inductance $L_{p1}$.

The electronic device 1 (220) comprises a RX communication module 222, a rectifier 224, a voltage regulator 226, a battery 228, and a secondary resonant circuit, depicted as capacitance $C_{s1}$ in series with inductance $L_{s1}$. The wireless charger 2 (230) comprises a TX communication module 232, a transmitter and controller 234, a power source 236, and a primary resonant circuit, depicted as capacitance $C_{p2}$ in series with inductance $L_{p2}$.

The electronic device 2 (240) comprises a RX communication module 242, a rectifier 244, a voltage regulator 246, a battery 248, and a secondary resonant circuit, depicted as capacitance $C_{s2}$ in series with inductance $L_{s2}$. The relationships between $C_{p1}$ and $C_{p2}$, and $L_{p1}$ and $L_{p2}$ are described in FIG. 3.

Figure 3:
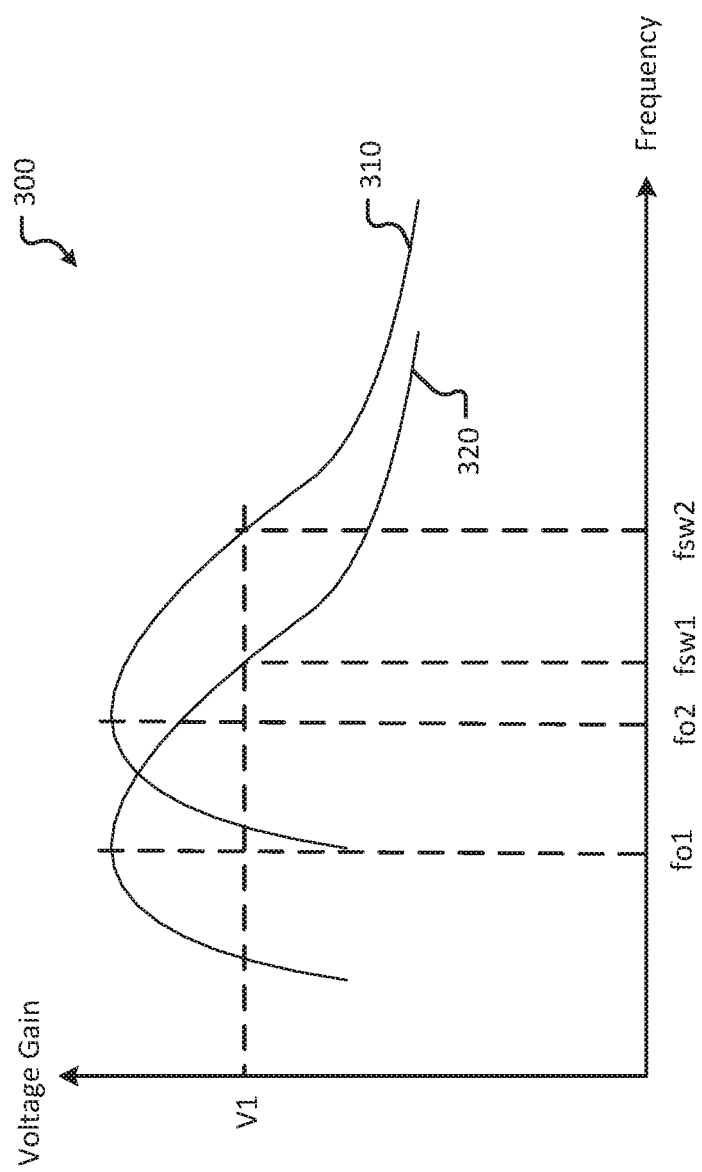
FIG. 3 is a graph showing voltage gain versus frequency signals for two adjacent wireless chargers in accordance with embodiments of the present disclosure.

FIG. 3 is a graph 300 showing voltage gain versus frequency signals 310 and 320 for two wireless chargers, in accordance with embodiments of the present disclosure, such as the wireless chargers 210 and 230 depicted in FIG. 2. Signal 310 corresponds to the voltage gain versus frequency for the first wireless charger, for example the wireless charger 1 (410) in FIG. 4A. Signal 320 corresponds to the voltage gain versus frequency for the second wireless charger, for example the wireless charger 2 (420) in FIG. 4A.

A wireless charger only uses the part of its operating frequency range where the primary coil current and voltage decreases while the operating frequency increases. This constraint ensures that the CEPs from an electronic device have a consistent effect: a positive Control Error Value causes the primary coil current to increase, and a negative Control Error Value causes the primary coil current to decrease, as described in the Wireless Power Consortium (WPC) Qi Wireless Power Transfer System standard.

In graph 300, for a voltage gain of V1, the wireless charger 1 (410) having a resonant frequency of fo1 requires a switching frequency of fsw1, and the wireless charger 2 (420) having a resonant frequency of fo2 requires a switching frequency of fsw2. To reduce the interference between the two wireless chargers, fo1 and fo2 must be sufficiently separated, and fsw1 and fsw2 must be sufficiently separated. The required separation is application specific. In some embodiments, a separation of 5% is sufficient and, in other applications, a separation of 10% is sufficient. The amount of separation may be further dependent on the configuration of the primary and secondary coils, the location of the electronic devices relative to the wireless chargers (including z displacement and orientation as described in FIG. 7), the positions of the wireless chargers, the tolerances of the electronic components, the primary coil voltage/current, as well as other factors. To achieve the desired separation of the resonant frequencies, inductances and capacitances are selected to provide desired resonant frequencies.

For the resonant circuits shown in FIG. 2, the resonant frequencies will differ when $C_{p1}$ is substantially equal to $C_{p2}$, e.g., within electronic component tolerances, but $L_{p1}$ is not equal to $L_{p2}$. Alternatively, $L_{p1}$ may substantially equal $L_{p2}$, e.g., within electronic component tolerances, but $C_{p1}$ is not equal to $C_{p2}$. Finally, $C_{p1}$ is not equal to $C_{p2}$, $L_{p1}$ is not equal to $L_{p2}$, and $C_{p1}$ multiplied by $L_{p1}$ is not equal to $C_{p2}$ multiplied by $L_{p2}$. The relationship between $L_{p1}$ and $L_{p2}$, and $C_{p1}$ and $C_{p2}$ may differ for other resonant circuits but the desire to separate the resonant frequencies of adjacent wireless chargers remains.

For the case where the electronic device 1 (430) and the electronic device 2 (440) to be charged are identical, having the same secondary resonant circuit values for Ls and Cs, then different resonant frequencies can be realized by having different primary resonant circuit values between the two adjacent wireless chargers, the wireless charger 1 (410) and the wireless charger 2 (420). The product of $L_p$ and $C_p$ for the first wireless charger 1 (410) must be made different from the product of $L_p$ and $C_p$ for the adjacent wireless charger 2 (420).

Figure 4B:
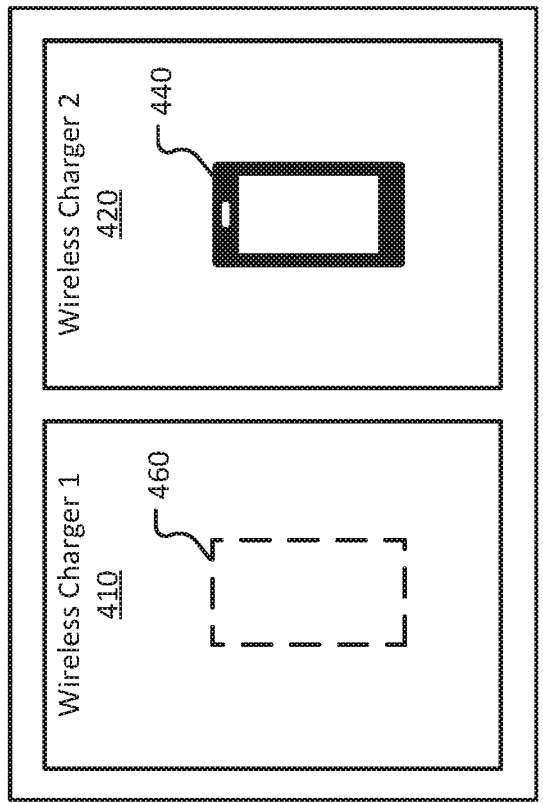
FIG. 4B depicts two adjacent wireless chargers where one electronic device is removed in accordance with embodiments of the present disclosure.
Figure 4A:
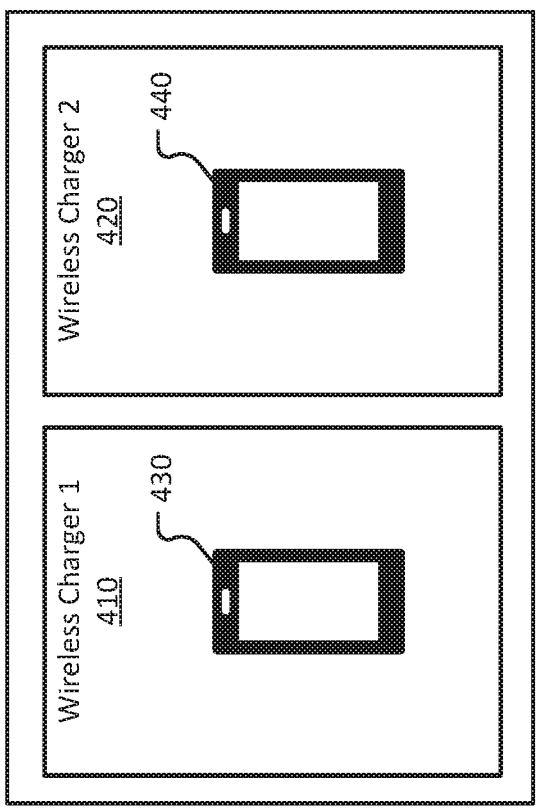
FIG. 4A depicts two adjacent wireless chargers each charging an electronic device in accordance with embodiments of the present disclosure.

FIG. 4A depicts two adjacent wireless chargers, the wireless charger 1 (410) and the wireless charger 2 (420), each charging an electronic device in accordance with embodiments of the present disclosure. In this example, the wireless charger 1 (410) charges the electronic device 430 and the wireless charger 2 (420) charges the electronic device 440. The wireless charger 1 (410) and the wireless charger 2 (420) are instances of the wireless charger 110, as described in FIG. 1. The electronic device 430 and the electronic device 440 are instances of the electronic device 150, as described in FIG. 1.

FIG. 4B depicts the two adjacent wireless chargers, the wireless charger 1 (410) and the wireless charger 2 (420), where one electronic device (i.e., electronic device 430) is removed in accordance with embodiments of the present disclosure. In this example, electronic device 430 is removed from the wireless charger 1 (410), denoted as dashed box 460, while the wireless charger 2 (420) continues to charge the electronic device 440. When the electronic device's 430 receiver is decoupled from the wireless charger's 1 (410) transmitter, the wireless charger's 1 (410) primary coil voltage and/or current exceeds a predetermined threshold resulting in increased EMI that may interfere with the operation of the wireless charger 2 (420). The predetermined voltage and current thresholds are dependent on the supplied voltage/current, the engineering tolerances of the electronic components, and voltage/current drops at the location that the voltage/current measurement is made.

In some embodiments, more than two wireless chargers are within sufficient proximity to interfere with the communication link between a wireless charger and the corresponding electronic device. For example, three wireless chargers may be placed in a row while each is charging an electronic device. Removing the electronic device from the middle wireless charger, may impact the wireless chargers located on one or both sides. Removing the electronic device from one of the wireless chargers on either side of the middle wireless charger, may impact the middle wireless charger or the two remaining wireless chargers. As shown in FIG. 3, interference may be greater when the resonant frequencies and/or switching frequencies cause an overlap in the voltage gain versus frequency graphs.

Figure 5:
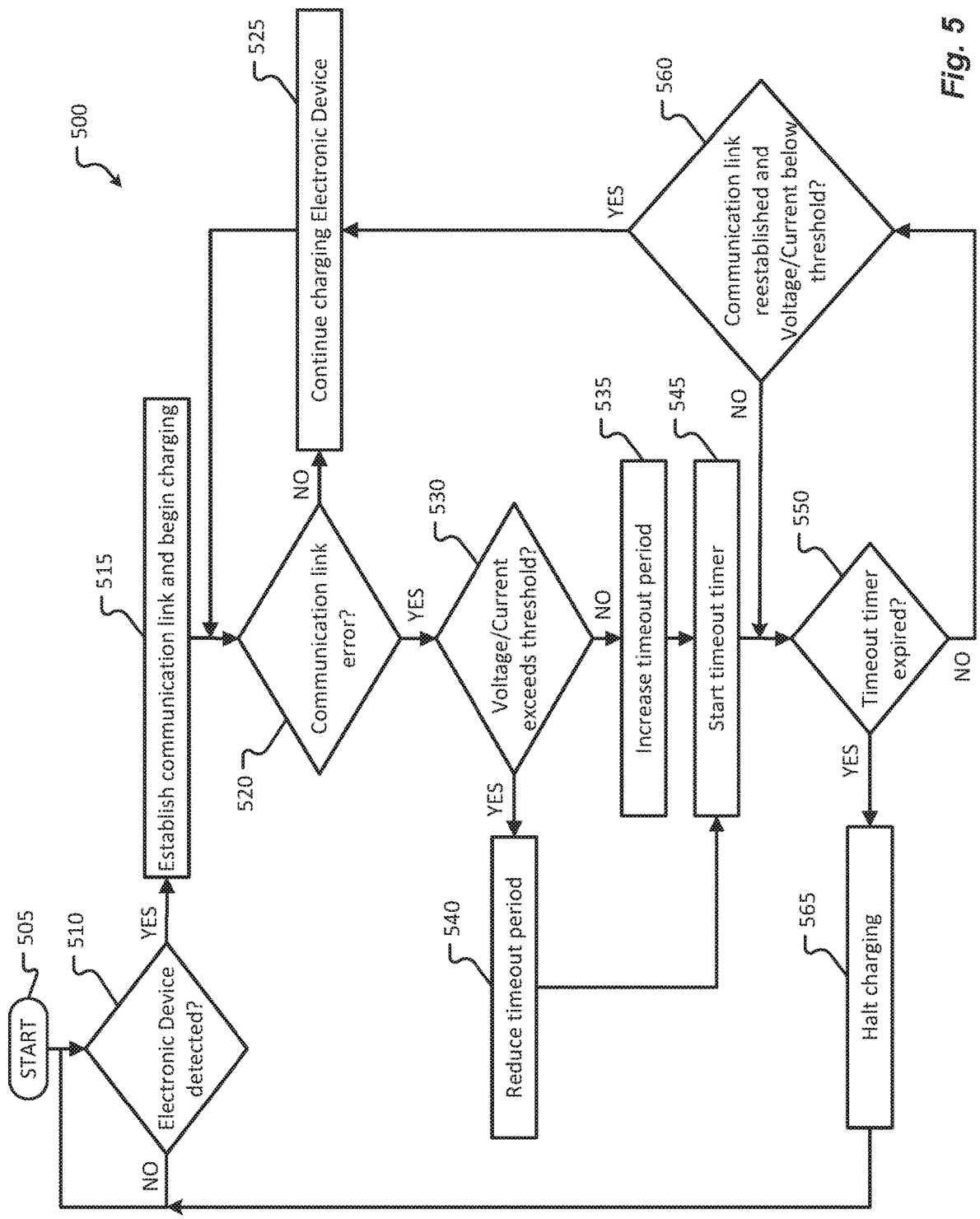
FIG. 5 is a flowchart illustrating an example process to adjust a timeout period in accordance with embodiments of the present disclosure.

FIG. 5 is a flowchart 500 illustrating an example process to adjust a timeout period in accordance with embodiments of the present disclosure. As previously discussed, adjacent wireless chargers in close proximity that are each charging an electronic device may interfere with each other's operation, as shown in FIGS. 4A-4B. This interference may cause one wireless charger to halt charging its electronic device when another electronic device is removed from an adjacent wireless charger, for example the wireless charger 2 (420) may halt charging the electronic device 440 after a communication link timeout. In some embodiments, the communication link timeout comprises a Control Error Packet (CEP) timeout period or Received Power Packet timeout, upon removal of the electronic device 430 from the wireless charger 1 (410) as shown in FIGS. 4A and 4B.

If the wireless charger 1 (410) has a communication link timeout of T1 and the wireless charger 2 (420) has a communication link timeout of T2, then premature shut down of the wireless charger 2 (420) may be avoided by causing T1 to be less than T2. In some embodiments, the wireless charger 1 (410) and the wireless charger 2 (420) start with the same default communication link timeout, and one or both of the wireless chargers adjust their respective communication link timeouts (e.g., T1 and/or T2) to cause T1 to be less than T2.

Figure 6:
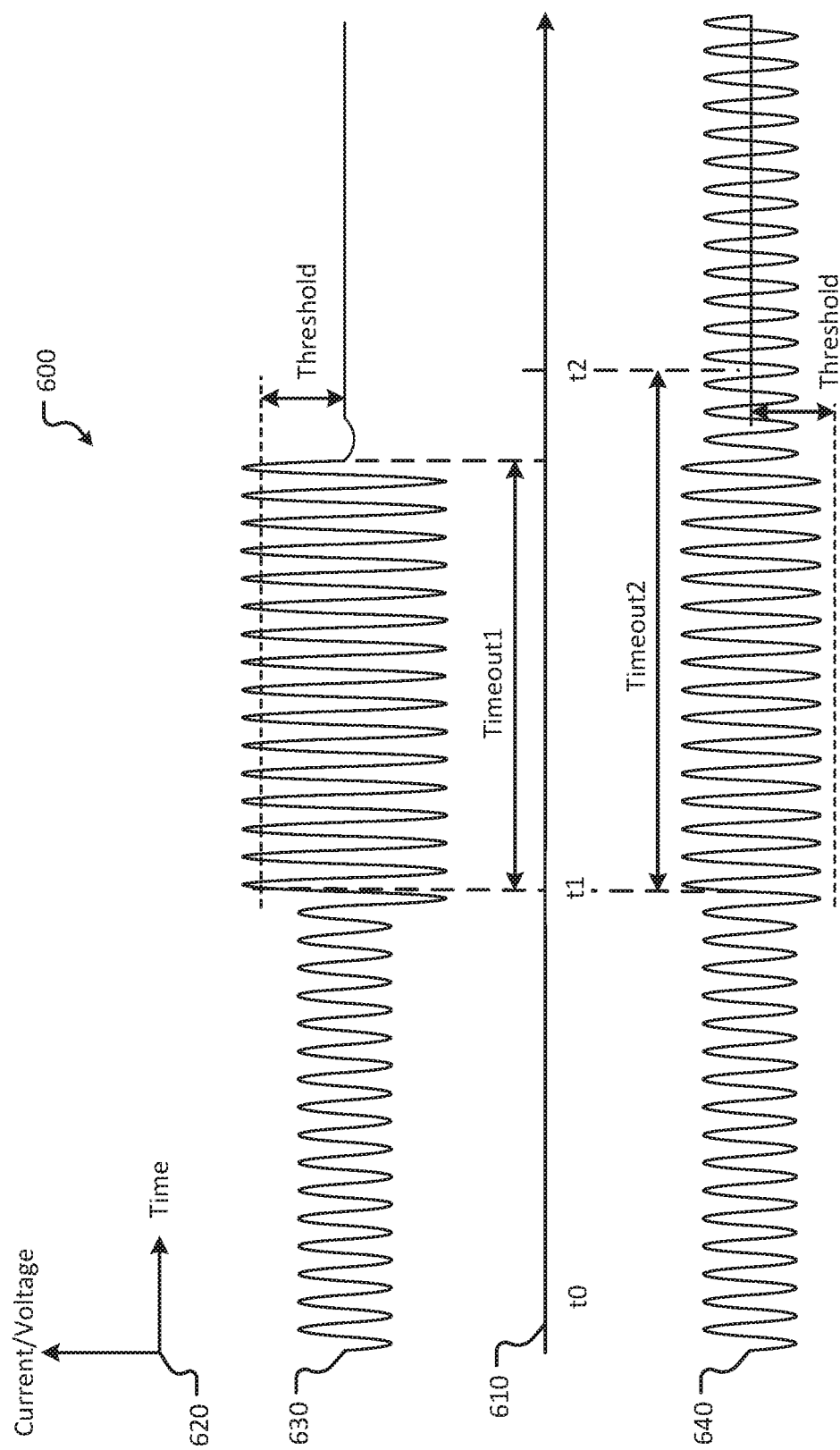
FIG. 6 is a graph that depicts changes in current/voltage versus time signals for two operating wireless charger units when one electronic device is removed in accordance with embodiments of the present disclosure.

For example, FIG. 6 shows a wireless charger stopping, or halting, charging of an electronic device at Timeout1 and allowing a second wireless charger to continue charging because the communication link is reestablished before the end of Timeout2. That is to say since Timeout2 is longer than Timeout1, the interference caused by the wireless charger 1 (410) stops when the wireless charger 1 (410) is halted (e.g., turned off) after Timeout 1, and the wireless charger 2 (420) receives uncorrupted data before the end of Timeout 2, signaling the electronic device 2 (440) is still charging. In other words, the communication link timeout timer for the wireless charger 2 (420) expires at time t2 giving the wireless charger 2 (420) time to receive a packet after the wireless charge 1 (410) halts charging at time (t1+Timeout1). Timeout2 may be intentionally set longer than Timeout1 by implementing the method described in flowchart 500 in FIG. 5. In some embodiments, communication link timeouts may be permanently set or set up upon configuration of the wireless charger 1 (410) and the wireless charger 2 (420).

Typically, an electronic device periodically sends a CEP containing a Control Error Value to the wireless charger that is charging the electronic device to cause the wireless charger to adjust the power that is being transferred, as described in the Wireless Power Consortium (WPC) Qi Wireless Power Transfer System standard. A positive Control Error Value directs the wireless charger to increase the primary coil voltage, or to decrease the operating frequency if the primary coil voltage has reached its maximum value causing $I_s$ to increase, see FIG. 1. A negative Control Error Value directs the wireless charger to increase the operating frequency, or to decrease the primary coil voltage if the operating frequency has reached a maximum value causing $I_s$ to decrease. Expiring of the CEP timeout period occurs when a CEP normally transmitted by the electronic device is not received by the wireless charger within a CEP timeout period. The CEP timeout period will expire when an electronic device is removed from a wireless charger or when an adjacent wireless charger's EMI causes the communication link to fail due to interference or data collisions. Similarly, failure to receive Received Power Packets during a timeout period results in a communication link timeout.

The method of flowchart 500 begins step 505. At test 510, the wireless charger determines if an electronic device is detected. If test 510 is NO, then flowchart 500 transitions back to test 510 until an electronic device is detected. If test 510 is YES, then the flowchart 500 transitions to step 515, and the wireless charger establishes communication with the electronic device and initiates charging. After step 515, flowchart 500 transitions to test 520 to determine if there is a communication link error preventing packets from being transferred between the wireless charger and electronic device. If test 520 is NO, then the wireless charger continues charging the electronic device in step 525. If test 520 is Yes, then flowchart 500 transitions to test 530. Test 530 determines if either the primary coil current and/or voltage exceeds a threshold corresponding to a level that indicates that the electronic device has been removed from the wireless charger, as depicted in FIG. 6. If test 530 is YES, then flowchart 500 transitions to step 540 and reduces the communication link timeout period, corresponding to a wireless charger that is no longer charging an electronic device. If test 500 is NO, then flowchart 500 transitions to step 535 to increase the communication link timeout period, corresponding to a wireless charger that is still charging an electronic device. Flowchart 500 transitions from step 535 or 540 to step 545 to start a communication link timeout timer. After step 545, flowchart 500 transitions to test 550. Test 550 determines if the communication link timeout timer has expired. If test 550 is YES, then flowchart 500 transitions to step 565 to halt charging the electronic device and transitions to test 510. If test 550 is NO, then flowchart 500 transitions to test 560. Test 560 determines if a communication link has been reestablished before the communication link timeout timer has expired, and that the primary coil voltage and current are below the predetermined threshold. If test 560 is YES, then flowchart 500 transitions to step 525 to continue charging the electronic device now that the communication link between the wireless charger and the electronic device is restored. If test 560 is NO, then flowchart 500 transitions back to test 550 to determine if the communication link timeout timer has expired. Flowchart 500 repeats tests 550 and 560 until either the communication link timeout timer expires, or communication is restored between the wireless charger and electronic device. In some embodiments, charging of the electronic device also halts when the electronic device's battery is charged or after a time period after the electronic device's battery is charged.

FIG. 6 is a graph 600 that depicts changes in current/voltage versus time 620 signals 630 and 640 for two operating wireless charger units, e.g., the wireless charger 1 (410) and the wireless charger 2 (420) when one electronic device is removed in accordance with embodiments of the present disclosure. At time t0, the two adjacent wireless chargers are charging electronic devices as shown in FIG. 4A. At time t1, the electronic device 430 is removed from the wireless charger 1 (410), as shown as dashed box 460 in FIG. 4B. After a time period corresponding to Timeout1, the wireless charger 1 (410) halts charging because the primary coil voltage or current has remained above a Threshold for a communication link timeout period determined by the wireless charger 1 (410). Since the wireless charger 2 (420) has a longer communication link timeout period, i.e., Timeout2 is larger than Timeout 1, the wireless charger 2 (420) continues to charge the electronic device 440. During time period Timeout1, the wireless charger 1 (410) may be causing data collisions that prevent the wireless charger 2 (420) from receiving communication link data from the electronic device 440.

Figure 7:
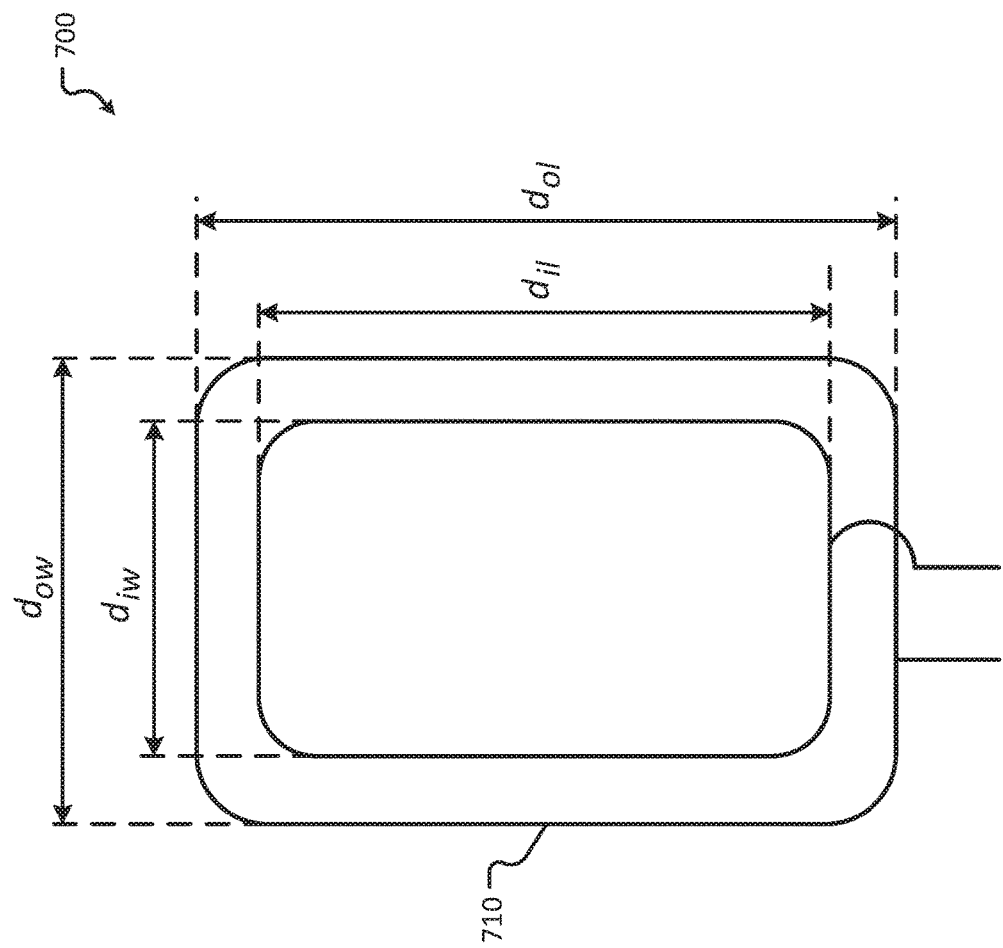
FIG. 7 depicts a design for a single coil in accordance with embodiments of the present disclosure.
Figure 7:
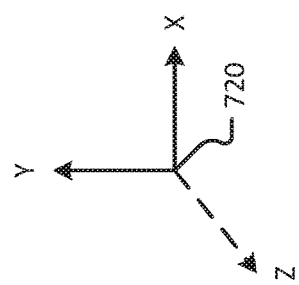

FIG. 7 depicts a design 700 for a single coil 710 in accordance with embodiments of the present disclosure. The axes 720 shows the Y axis in the vertical direction, the X axis in the horizontal direction, and the Z axis, called the z displacement, perpendicular to the X-Y plane. Single coil solution 710 is designed to meet both wide charging area and increased z displacement between the wireless charger's primary coil and an electronic device's secondary coil. For example, single coil 710 may be inductance $L_{p1}$ as shown in FIG. 1. Advantageously, the design allows for a larger charging area.

More specifically, a single coil solution with larger dimensions is used as a transmitter coil for a wireless charger instead of a typical multi-coil approach for covering large charging areas at increased displacements between the transmitting (primary coil of the wireless charger) and receiving coils (secondary coils of the electronic device) of up to but not limited to 20 mm. In some embodiments, an outer diameter width, $d_{ow}$, and outer diameter length, $d_{ol}$, greater than 70 mm may be used. A total single coil solution may utilize such single coil 710 together with appropriate hardware and/or firmware. The inner dimensions, $d_{iw}$ and $d_{il}$, outer dimensions, $d_{ow}$ and dot, the number of turns, the number of strands, the gauge of the wire, and the inductance core material used are application specific. Specifically, EMI requirements, such as environmental regulations, limit the size of single coil 710, where the dimensions of single coil 710 may be larger as the transmitted power requirement decreases. For example, as the z displacement between the transmitter coil and the receiver coil increases, leakage flux increases causing an increase in coupling between adjacent wireless chargers.

Figure 8:
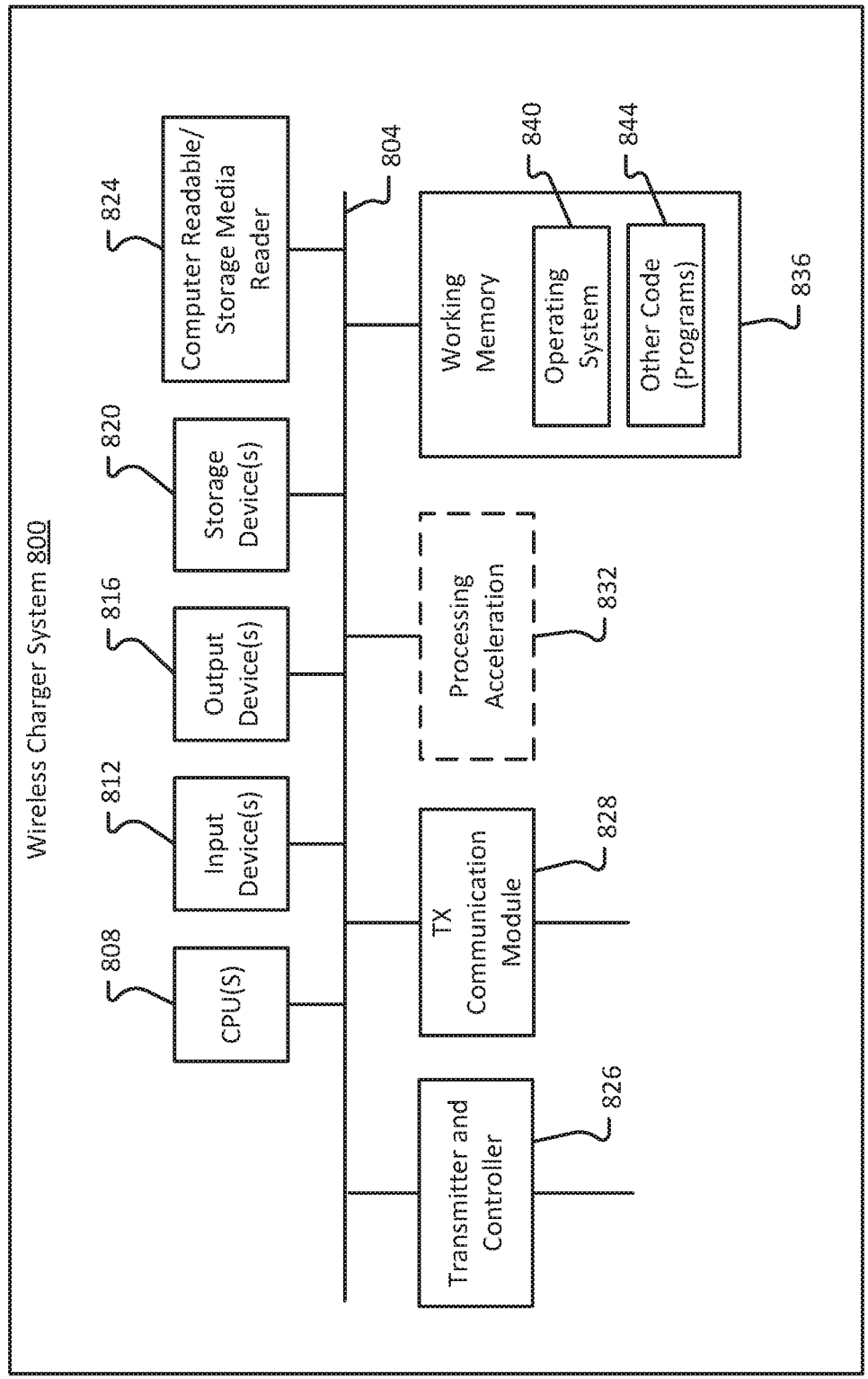
FIG. 8 is a block diagram of a wireless charger system associated with one or more components described herein.

FIG. 8 is a block diagram of a wireless charger system 800 associated with one or more components described herein. The wireless charger system 800 is shown comprising hardware elements that may be electrically coupled via a bus 804. The hardware elements may include one or more central processing units (CPUs) 808; one or more input devices 812 (e.g., a mouse, a keyboard, etc.); and one or more output devices 816 (e.g., a display device, a printer, etc.). The wireless charger system 800 may also include one or more storage devices 820. By way of example, the storage device(s) 820 may be disk drives, optical storage devices, solid-state storage devices such as a random access memory (RAM) and/or a read-only memory (ROM), which can be programmable, flash-updateable and/or the like.

The wireless charger system 800 may additionally include a computer-readable storage media reader 824; a transmitter and controller 826, as described in FIG. 1; a TX communication module 828, as described in FIG. 1, (comprising a demodulate and modulator for frequency-shift keying (FSK) data to exchange data between the wireless charger and electronic device as well as other communication requirements, e.g., a modem, a network card (wireless or wired), an infra-red communication device, etc.); and working memory 836, which may include RAM and ROM devices as described above. The wireless charger system 800 may also include a processing acceleration unit 832, which can include a DSP, a special-purpose processor, and/or the like.

The computer-readable storage media reader 824 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The TX communication module 828 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The wireless charger system 800 may also comprise software elements, shown as being currently located within a working memory 836, including an operating system 840 and/or other code 844, including code to execute the process depicted in flowchart 500 illustrating an example process to adjust a timeout period as shown in FIG. 5, and code to execute to implement functionality required by the TX communication module 828, and transmitter and controller 826, single-phase or multi-phase transmitter. It should be appreciated that alternate embodiments of a wireless charger system 800 may have numerous variations from that described above. For example, customized hardware might also be used and/or particular elements might be implemented in hardware, software (including portable software, such as applets), or both. Further, connection to other computing devices such as network input/output devices may be employed.

Examples of processor 808 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300™, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 9:
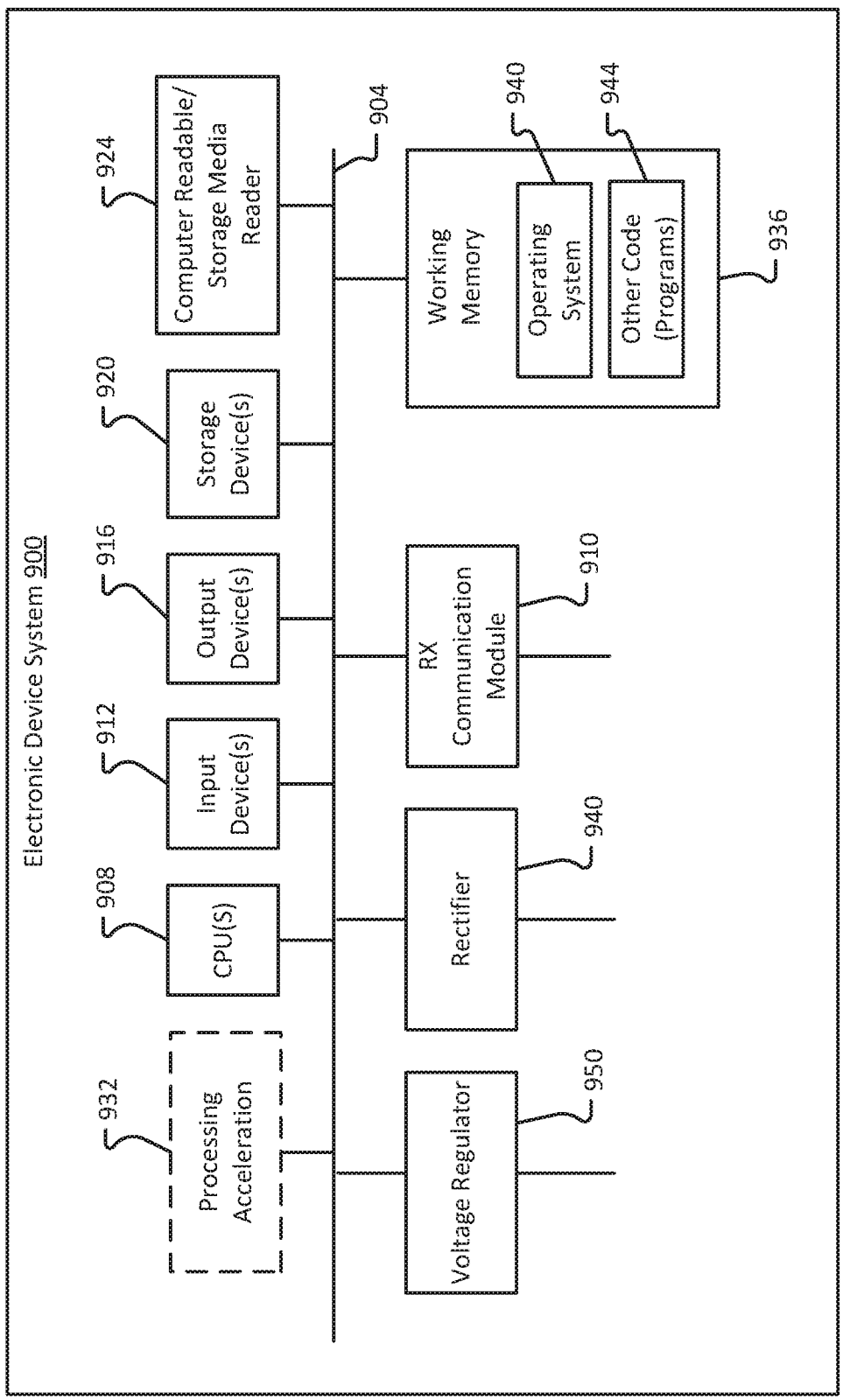
FIG. 9 is a block diagram of an electronic device system associated with one or more components described herein.

FIG. 9 is a block diagram of an electronic device system 900 associated with one or more components described herein. The electronic device system 900 is shown comprising hardware elements that may be electrically coupled via a bus 904. The hardware elements may include one or more central processing units (CPUs) 908; one or more input devices 912 (e.g., a mouse, a keyboard, etc.); and one or more output devices 916 (e.g., a display device, a printer, etc.). The electronic device system 900 may also include one or more storage devices 920. By way of example, the storage device(s) 920 may be disk drives, optical storage devices, solid-state storage devices such as a random access memory (RAM) and/or a read-only memory (ROM), which can be programmable, flash-updateable and/or the like. Examples of the processor 908 as described herein may include examples described for processor 808 in FIG. 8.

The electronic device system 900 may additionally include a computer-readable storage media reader 924; an RX communication module 910, as described in FIG. 1, (comprising a demodulate and modulator for frequency-shift keying (FSK) data to exchange data between the wireless charger and electronic device as well as other communication requirements, e.g., a modem, a network card (wireless or wired), an infra-red communication device, etc.); a rectifier 940, as described in FIG. 1; a voltage regulator 950, as described in FIG. 1, and working memory 936, which may include RAM and ROM devices as described above. The electronic device system 900 may also include a processing acceleration unit 932, which can include a DSP, a special-purpose processor, and/or the like.

The computer-readable storage media reader 924 can further be connected to a computer-readable storage medium, together (and, optionally, in combination with storage device(s) 920) comprehensively representing remote, local, fixed, and/or removable storage devices plus storage media for temporarily and/or more permanently containing computer-readable information. The RX communication module 910 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The electronic device system 900 may also comprise software elements, shown as being currently located within a working memory 936, including an operating system 940 and/or other code 944. Other code 944 that may be executed includes code implementing functionality required by the RX communication module 910, rectifier 940, and the voltage regulator 950. It should be appreciated that alternate embodiments of an electronic device system 900 may have numerous variations from that described above. For example, customized hardware might also be used and/or particular elements might be implemented in hardware, software (including portable software, such as applets), or both. Further, connection to other computing devices such as network input/output devices may be employed.

Any of the steps, functions, and operations discussed herein can be performed continuously and automatically.

The exemplary systems and methods of this disclosure have been described in relation to a charging device, such as having a wireless charging device. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components in a single device, certain components can be in one or multiple devices. Thus, it should be appreciated, that the components can be combined into one or more devices.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a wireless charging system for reducing interference in adjacent active wireless charging components comprising: a first wireless charging component comprising a first resonant circuit, the first wireless charging component coupled to a first electronic device; and a second wireless charging component comprising a second resonant circuit, the second wireless charging component adjacent to the first wireless charging component and coupled to a second electronic device, wherein a first resonant frequency of the first resonant circuit is different than a second resonant frequency of the second resonant circuit.

Aspects of the above wireless charging system comprise, wherein the first resonant circuit further comprises a first resonant capacitance and a first resonant inductance, wherein the second resonant circuit further comprises a second resonant capacitance and a second resonant inductance, wherein the first resonant capacitance is different than the second resonant capacitance, wherein the first resonant inductance is different than the second resonant inductance, and wherein a product of the first resonant capacitance and the first resonant inductance is different than a product of the second resonant capacitance and the second resonant inductance.

Aspects of the above wireless charging system comprise, wherein the first resonant capacitance is substantially equal to the second resonant capacitance, and wherein the first resonant inductance is different than the second resonant inductance.

Aspects of the above wireless charging system comprise, wherein the first resonant capacitance is different than the second resonant capacitance, and wherein the first resonant inductance is substantially equal to the second resonant inductance.

Embodiments include a wireless charging system for avoiding shutdown in adjacent active wireless charging components comprising: a first wireless charging component, the first wireless charging component coupled to a first electronic device; a second wireless charging component, the second wireless charging component adjacent to the first wireless charging component and coupled to a second electronic device; a processor detects an increase in a first voltage of the first wireless charging component above a predetermined voltage threshold; and in response to detecting the increase in the first voltage, the processor adjusts a first communication link timeout of the first charging component.

Aspects of the above wireless charging system include, wherein the increase in the first voltage of the first wireless charging component occurs when the first electronic device is decoupled from the first wireless charging component.

Aspects of the above wireless charging system include, wherein the first communication link timeout of the first wireless charging component is reduced below a default communication link timeout.

Aspects of the above wireless charging system further comprises: the processor detecting a second voltage of the second wireless charging component is below the predetermined voltage threshold.

Aspects of the above wireless charging system include, wherein a second communication link timeout of the second wireless charging component is increased above a default communication link default timeout.

Aspects of the above wireless charging system include, wherein the processor detects a primary coil current of the second wireless charging component is below a predetermined current threshold.

Aspects of the above wireless charging system include, wherein the processor detects a primary coil current of the first wireless charging component exceeding a predetermined current threshold.

Aspects of the above wireless charging system include, wherein the first voltage comprises a primary coil voltage gain.

Aspects of the above wireless charging system further comprises: the processor detects an absence of receipt from the second electronic device of a non-corrupt control error packet during a default communication link timeout and detects the receipt of the non-corrupt control error packet prior to the second communication link timeout, and wherein a second voltage of the second charging component remains below the predetermined voltage threshold.

Embodiments include a method for avoiding shutdown in adjacent active wireless charging components comprising: detecting an increase in a first voltage of a first wireless charging component above a predetermined voltage threshold; and in response to detecting the increase in the first voltage, adjusting a first communication link timeout of the first wireless charging component.

Aspects of the above method include, wherein the increase in the first voltage of the first wireless charging component occurs when a first electronic device is decoupled from the first wireless charging component.

Aspects of the above method include, wherein the first communication link timeout of the first wireless charging component is reduced below a default communication link timeout.

Aspects of the above method further comprises: detecting an increase of a second voltage of a second wireless charging component adjacent to the first wireless charging component and a second electronic device coupled to the second wireless charging component, wherein the second voltage occurs when the first electronic device is decoupled from the first wireless charging component, and wherein the second voltage is below the predetermined voltage threshold.

Aspects of the above method include, wherein a second communication link timeout of the second wireless charging component is increased above a default communication link timeout.

Aspects of the above method include, wherein detecting a primary coil current of the second wireless charging component is below a predetermined current threshold.

Aspects of the above method further comprises: detecting receipt from the second electronic device of a non-corrupt control error packet prior to the second communication link timeout.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A wireless charging system for avoiding shutdown in adjacent active wireless charging components comprising:

a first wireless charging component, the first wireless charging component electromagnetically coupled to a first electronic device;

a second wireless charging component, the second wireless charging component being positioned adjacent to the first wireless charging component and electromagnetically coupled to a second electronic device; and the first wireless charging component detects an increase in a first voltage of the first wireless charging component above a predetermined voltage threshold;

wherein, in response to detecting the increase in the first voltage above the predetermined voltage threshold, the first wireless charging component adjusts a first Control Error Packet (CEP) timeout period of the first wireless charging component.

2. The system according to claim 1, wherein the increase in the first voltage of the first wireless charging component occurs when the first electronic device is decoupled from the first wireless charging component.

3. The system according to claim 1, wherein the first CEP timeout period of the first wireless charging component is reduced below a default CEP timeout period.

4. The system according to claim 2, further comprising: the second wireless charging component detecting a second voltage of the second wireless charging component is below the predetermined voltage threshold.

5. The system according to claim 4, wherein a second CEP timeout period of the second wireless charging component is increased above a default CEP timeout period.

6. The system according to claim 4, wherein the second wireless charging component detects a primary coil current of the second wireless charging component is below a predetermined current threshold.

7. The system according to claim 1, wherein the first wireless charging component detects a primary coil current of the first wireless charging component exceeding a predetermined current threshold.

8. The system according to claim 1, wherein the first voltage comprises a primary coil voltage gain.

9. The system according to claim 5, further comprising: the second wireless charging component detects an absence of receipt from the second electronic device of a non-corrupt control error packet during a default CEP timeout period and detects the receipt of the non-corrupt control error packet prior to an end of the second CEP timeout period, and wherein a second voltage of the second wireless charging component remains below the predetermined voltage threshold.

10. A method for avoiding shutdown in adjacent active wireless charging components comprising:

detecting, by a first wireless charging component, an increase in a first voltage of the first wireless charging component above a predetermined voltage threshold; and in response to detecting the increase in the first voltage above the predetermined voltage threshold, adjusting, by the first wireless charging component, a first Control Error Packet (CEP) timeout period of the first wireless charging component.

11. The method according to claim 10, wherein the increase in the first voltage of the first wireless charging component occurs when a first electronic device is decoupled from the first wireless charging component.

12. The method according to claim 10, wherein the first CEP timeout period of the first wireless charging component is reduced below a default CEP timeout period.

13. The method according to claim 11, further comprising:

detecting an increase of a second voltage of a second wireless charging component adjacent to the first wireless charging component and a second electronic device coupled to the second wireless charging component, wherein the increase in the second voltage occurs when the first electronic device is decoupled from the first wireless charging component, and wherein the second voltage is below the predetermined voltage threshold.

14. The method according to claim 13, wherein a second CEP timeout period of the second wireless charging component is increased above a default CEP timeout period.

15. The method according to claim 13, wherein detecting a primary coil current of the second wireless charging component is below a predetermined current threshold.

16. The method according to claim 14, further comprising:

detecting receipt from the second electronic device of a non-corrupt control error packet prior to an end of the second CEP timeout period.

\* \* \* \* \*